United States Patent
Welch

(10) Patent No.: US 7,172,134 B2
(45) Date of Patent: Feb. 6, 2007

(54) FREEZER ALARM SYSTEM AND APPARATUS FOR REFRIGERATION UNITS

(76) Inventor: William Welch, 1760 Whites La., Yazoo City, MS (US) 39194

( * ) Notice: Subject to any disclaimer, the term of this patent is extended or adjusted under 35 U.S.C. 154(b) by 331 days.

(21) Appl. No.: 10/826,628

(22) Filed: Apr. 19, 2004

(65) Prior Publication Data

US 2005/0229611 A1   Oct. 20, 2005

(51) Int. Cl.
*G05D 23/00* (2006.01)
*G01K 13/00* (2006.01)
*G08B 17/00* (2006.01)

(52) U.S. Cl. .......................... 236/94; 62/129; 340/585

(58) Field of Classification Search .................. 62/129, 62/126, 127; 340/585, 529, 588, 589; 236/94
See application file for complete search history.

(56) References Cited

U.S. PATENT DOCUMENTS

| | | | |
|---|---|---|---|
| 4,144,532 A * | 3/1979 | Boyd | ........................ 340/585 |
| 4,169,357 A | 10/1979 | Kelley | |
| 4,283,921 A | 8/1981 | Prosky | |
| 4,482,785 A * | 11/1984 | Finnegan et al. | ........ 379/22.03 |
| 4,855,721 A | 8/1989 | Hallett et al. | |
| 5,917,416 A * | 6/1999 | Read | .......................... 340/584 |
| 6,034,607 A | 3/2000 | Vidaillac | |

FOREIGN PATENT DOCUMENTS

JP   2001154676 A  *  6/2001

* cited by examiner

*Primary Examiner*—Chen-Wen Jiang
(74) *Attorney, Agent, or Firm*—Theresa M. Seal

(57) ABSTRACT

A freezer alarm system and apparatus for monitoring the temperature in the freezer compartment of a refrigeration unit includes a housing mountable on a wall adjacent the refrigeration unit for plugging into a wall outlet. A capillary tube extends from the housing and terminates with a temperature sensor that is mounted inside the refrigeration unit for sensing when the temperature increases therein past a given temperature preset by an adjustable thermostat located on the housing. When this event occurs contacts within the housing close thereby actuating an audible buzzer and a visible luminary alarm warning the owner that the temperature within the refrigeration unit has exceeded a safe pre-set level and that the refrigeration unit needs checked for remedial action.

1 Claim, 5 Drawing Sheets

FREEZER ALARM SYSTEM AND APPARATUS FOR REFRIGERATION UNITS

FIELD OF THE INVENTION

The present invention pertains to temperature monitoring systems for refrigeration units, and more particularly pertains to a freezer alarm system and apparatus that produces both audible and visible alarm indicators when a pre-set temperature value or range has been exceeded so that the refrigeration unit can be checked, serviced or replaced.

BACKGROUND OF THE INVENTION

Refrigeration units for storing items such as meat and frozen foods over long periods of time are an essential component of contemporary life. Refrigeration units have widespread applicability and are found in such places as: refrigerators, coolers, ice cream boxes and freezers used for storing domestic family food items; ice cream and frozen food coolers and freezers in grocery stores; freezers and walk-in coolers for storage of the many food items used by public restaurants, school cafeterias and workplace cafeterias, and fast food stores; ice makers in restaurants and hotels for continuously supplying ice to patrons and guests; upright freezers and coolers in hospitals and veterinary clinics for storing medicine and blood at precise temperatures; refrigeration rooms in slaughterhouses; and computer operation rooms for cooling and dissipating the heat produced by mainframe computers.

In the above applications, as well as many others, the various items must be maintained within the refrigeration unit at below freezing temperatures for considerable lengths of time. Should the refrigeration unit fail, and the failure remain undetected, the items stored therein will degrade and spoil and have to be thrown out. The hardship this works not just for commercial and industrial enterprises, but for ordinary homeowners could be considerable. For example, an elderly couple on a fixed income would store the bounty of a summer season in their freezer for use throughout the winter only to lose that surplus bounty because the freezer broke down unbeknownst to them; and upon discover of the break down, the items stored within would have long since spoiled and must therefore be discarded nullifying the patient work and preparation of many months. Another example of the considerable loss that would occur would be the case of a single parent having purchased a large quantity of meat and produce for storage and use as needed throughout the winter, only to lose those stored items upon a freezer failure that remains undiscovered for many days.

Compounding the problem that refrigeration units often fail is the fact that many refrigeration units are located in basements, garages, or other out of the way places that are infrequently visited and inspected. As a result, the refrigeration unit may fail, and the failure may not become known for days, weeks or even months thereafter; and thus the ability of the refrigeration unit to maintain freezing conditions within the freezer cavity for the general 24 hour period after the initial failure is of only marginal value. While some refrigeration units do include warning or alarm lights, the lights are often too small to be noticeable unless they are viewed up close.

The prior art discloses a number of alarm devices and systems for freezing units to meet and overcome the above problems relating to refrigeration unit failure.

Thus, the Boyd device (U.S. Pat. No. 4,144,532) discloses a food freezer alarm that includes a sealed container mountable within the freezer compartment wherein a phase change of material within the container, resulting from a temperature increase, causes a conductive member to engage contacts that close a switch and set off an alarm warning the owner of undesirably high temperatures within the compartment.

The Kelley patent (U.S. Pat. No. 4,169,357) discloses a refrigerator-monitoring device that includes a temperature sensitive switch that closes when the temperature rises above a preset level thereby actuating a visible alarm and an audible alarm.

The Prosky patent (U.S. Pat. No. 4,283,921) discloses a freezer case alarm system that includes a sensing element operatively connected to a microcomputer so that the freezer compartment can be monitored, and if the temperature exceeds a certain limit, a first and a second alarm condition are energized.

The Hallett et al. patent (U.S. Pat. No. 4,855,721) discloses a freezer alarm apparatus that includes a sensor mounted within the freezer compartment that communicates with an externally mounted control unit for actuating a LED when the temperature within the compartment exceeds a preset temperature.

The Vidaillac patent (U.S. Pat. No. 6,034,607) discloses an electronic temperature alarm system that monitors ambient freezer temperature by a thermoresistor and in which a sound alarm is triggered by a piezoelectric buzzer when the freezer temperature exceeds a predetermined value.

Nonetheless, the remains a need for a freezer alarm system that is easy to install and provides clear and distinct signaling, in several forms, for remedial action and problem correction when the freezer unit temperature has exceeded a predetermined value.

SUMMARY OF THE INVENTION

The present invention comprehends a freezer alarm system and apparatus for monitoring the temperature within the freezer cavity of a refrigeration unit and producing warning signals when the temperature exceeds a pre-set value. The freezer alarm system and apparatus includes a housing that is mountable to a wall adjacent the refrigeration unit, and the housing plugs into a standard wall receptacle. Extending from the housing is a capillary tube, and the capillary tube terminates with a temperature-sensing bulb that is placed within the freezer cavity. An adjustable thermostat is mounted on the housing and is in registration with the sensing bulb so that when the temperature within the freezer cavity exceeds a temperature set point on the thermostat, the thermostat actuates an audible buzzer alarm and a visual indicator light to warn the owner that the refrigeration unit needs checked and remedial or corrective action is required.

It is an objective of the present invention to provide a freezer alarm system and apparatus that can be easily and quickly installed in various types of refrigeration units.

It is another objective of the present invention to provide a freezer alarm system and apparatus that provides both audible and visual signaling so that refrigeration unit failure cannot be overlooked or missed.

It is yet another objective of the present invention to provide a freezer alarm system and apparatus that can be easily and quickly retrofitted to residential, commercial, and industrial refrigeration units.

It is still yet another objective of the present invention to provide a freezer alarm system and apparatus that provides the substantial savings to the owner or user by immediately alerting the owner or user that the freezer temperature has raised and that corrective action should be taken so that spoilage of the products therein can be avoided.

Yet another objective of the present invention is to provide a freezer alarm system and apparatus that includes a minimum number of mechanical parts and elements and is therefore easy to operate and reasonably priced, especially for individuals and families on fixed incomes.

These and other objects, features and advantages will become apparent to one skilled in the art upon a perusal of the following detailed description when read in conjunction with the accompanying drawing figures.

DETAILED DESCRIPTION OF THE PREFERRED EMBODIMENT

Illustrated in FIGS. 1–5 is a freezer alarm system and apparatus 10 that is used to monitor the temperature in the freezer compartment 12 of a refrigeration unit 14 such as domestic, commercial and industrial refrigeration units that can include domestic refrigerators, freezers, icemakers, commercial freezers and coolers for meats, produce, and other food items, medical freezers in hospitals and veterinary clinics, and industrial refrigeration units for maintaining precision equipment in control and computer rooms at below freezing temperatures. The freezer alarm system and apparatus 10 is designed utilization with or retrofitting to all types of refrigeration units currently in domestic, commercial and industrial use.

Figure 1:
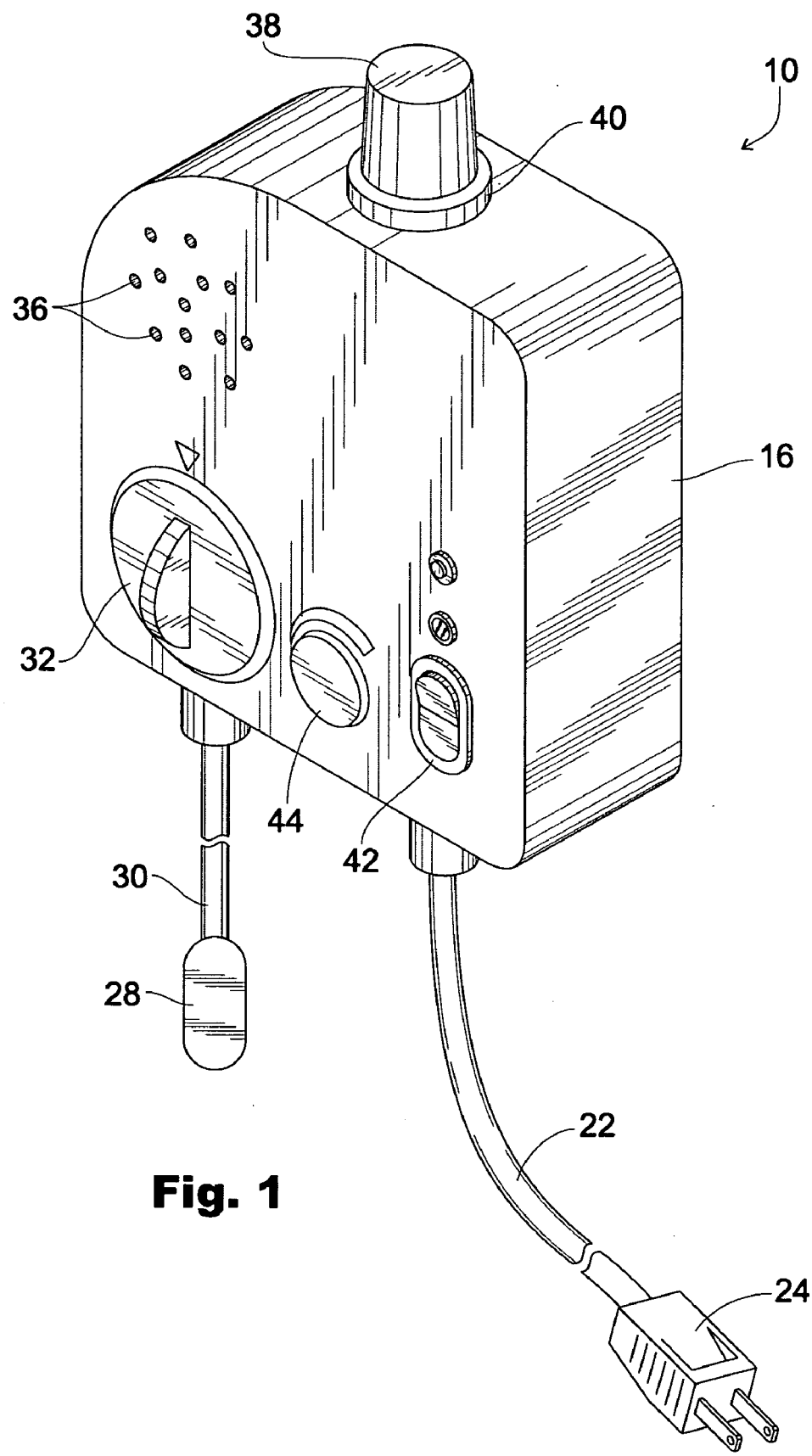
FIG. 1 is a perspective view of the freezer alarm system and apparatus of the present invention.
Figure 2:
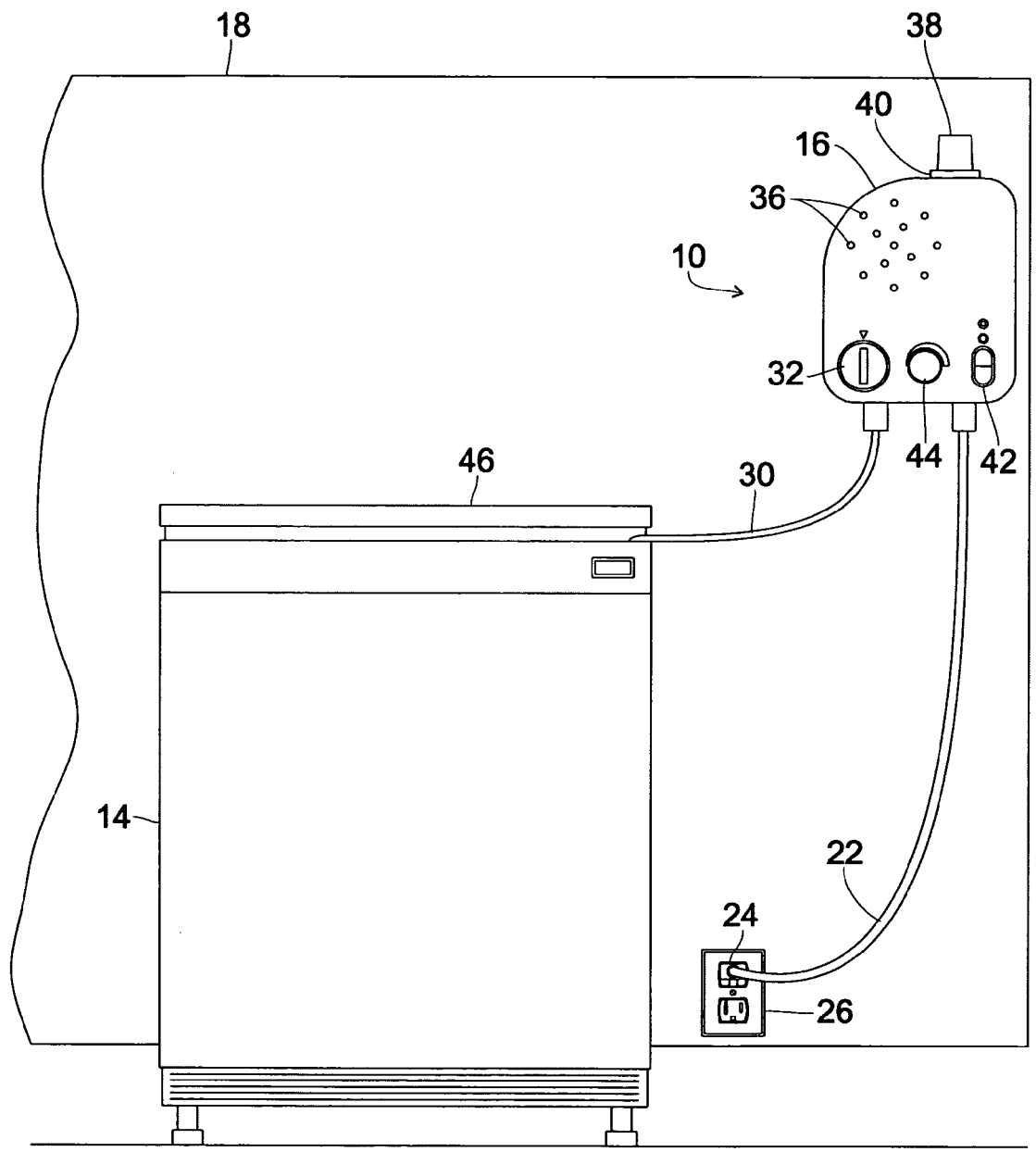
FIG. 2 is a front elevational view of the freezer alarm system and apparatus of the present invention illustrating the freezer alarm system and apparatus mounted on a wall for use with a floor-standing freezer.
Figure 3:
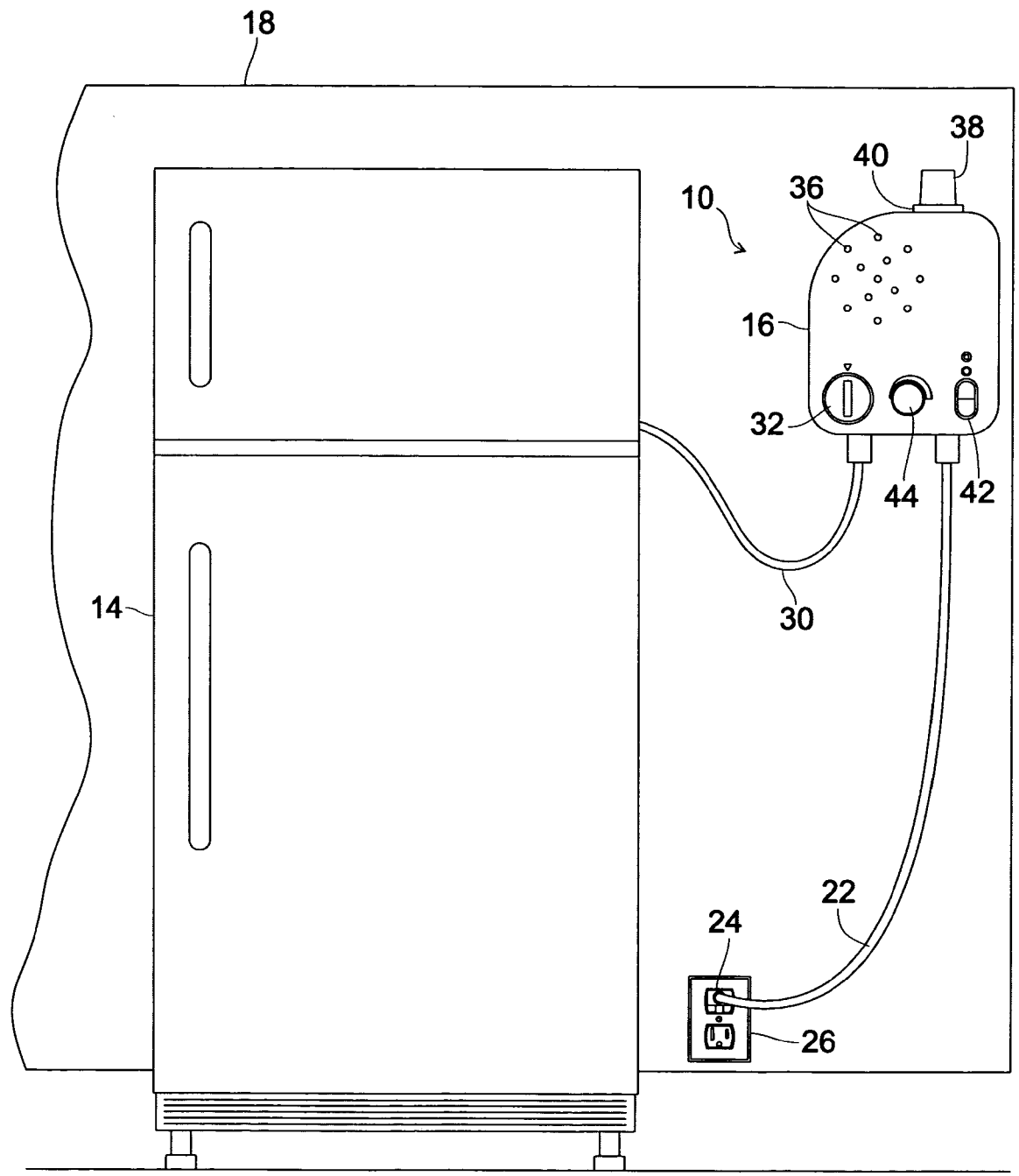
FIG. 3 is a front elevational view of the freezer alarm system and apparatus of the present invention illustrating the freezer alarm system and apparatus mounted on a wall for use with a refrigerator.
Figure 4:
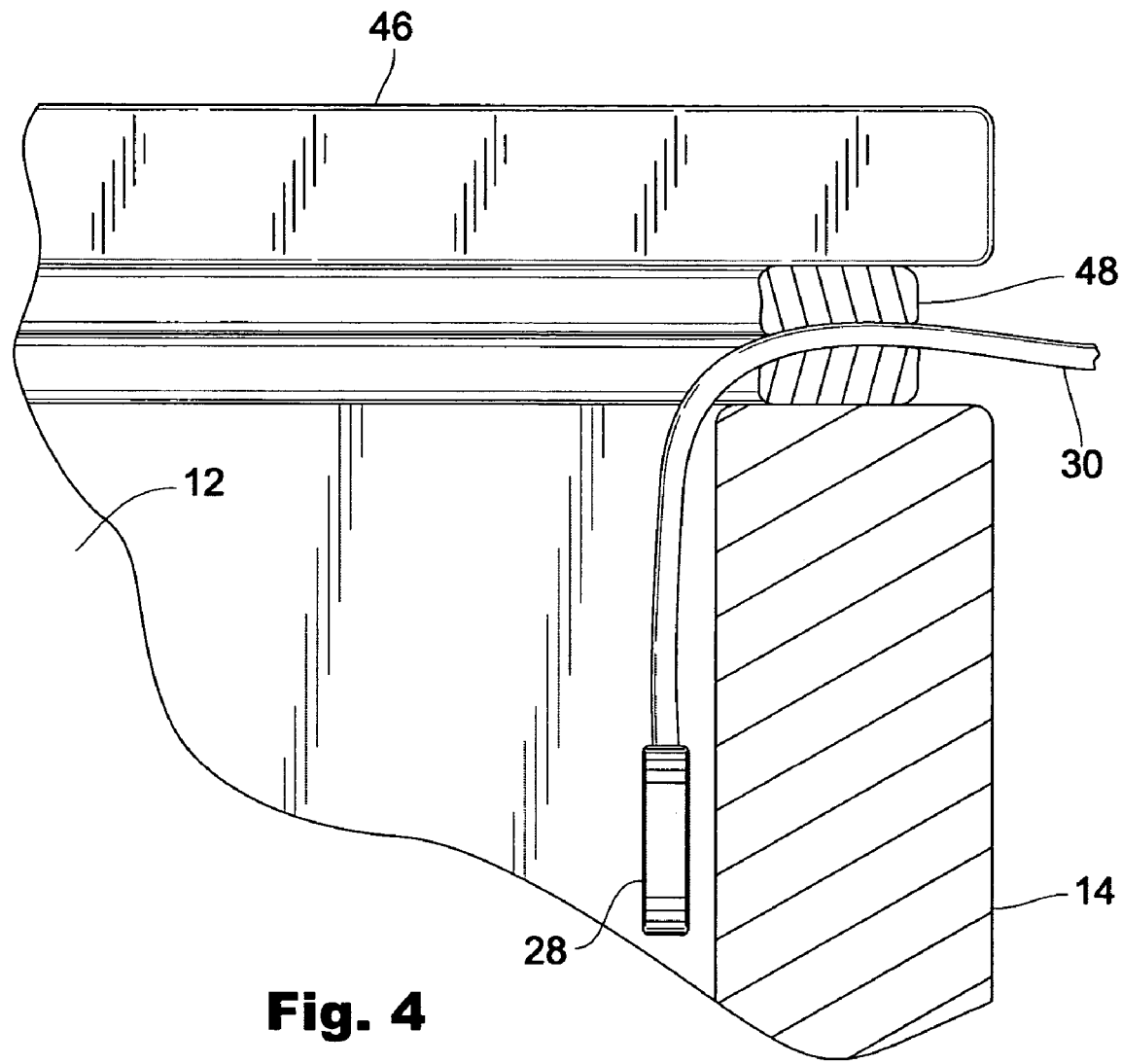
FIG. 4 is a sectioned elevational of the freezer alarm system and apparatus of the present invention illustrating the disposition of the temperature sensor within the freezer cavity of the refrigeration unit.
Figure 5:
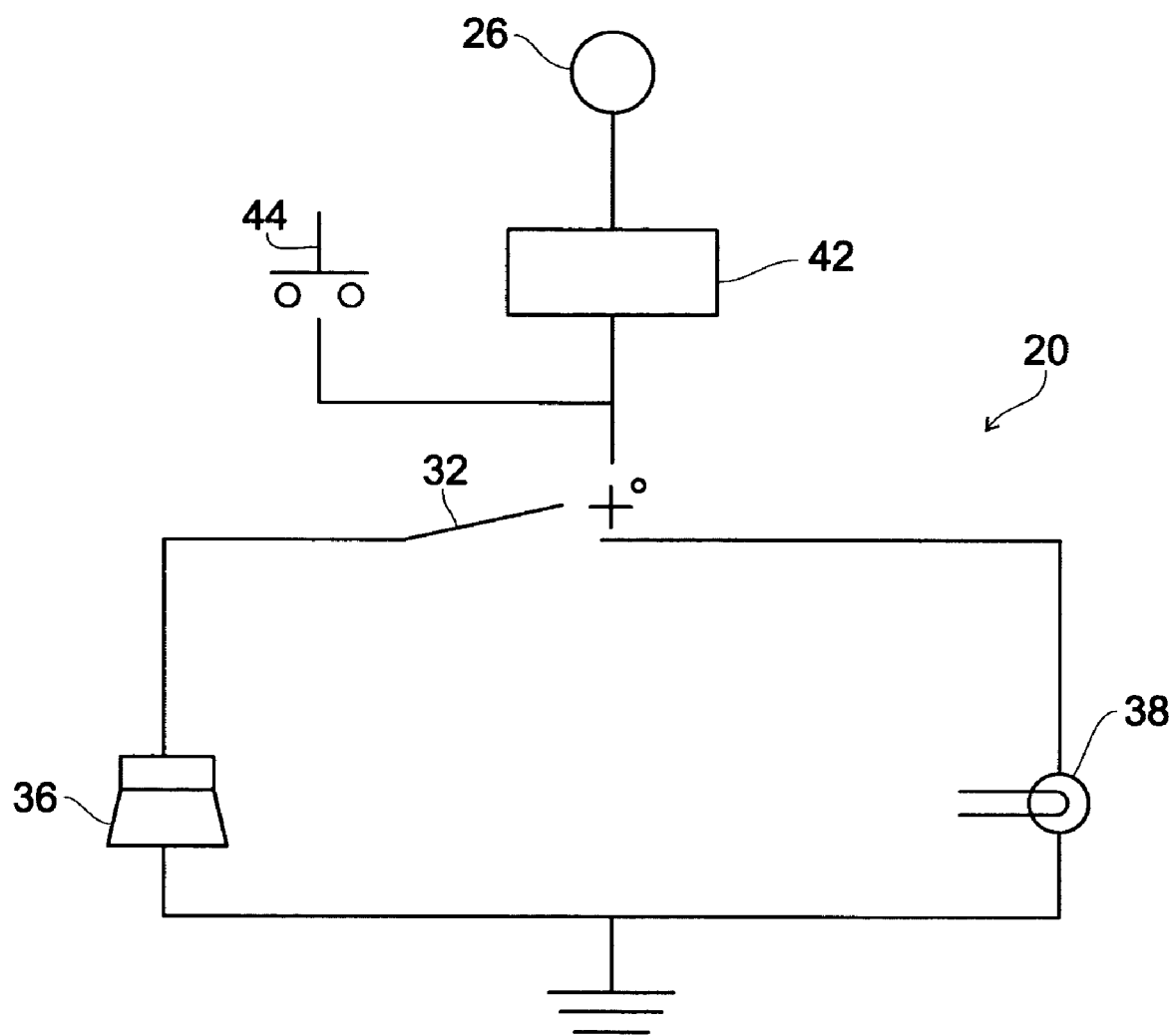
FIG. 5 is an electrical schematic of the freezer alarm system and apparatus of the present invention.

As shown in FIGS. 1–5, the freezer alarm system and apparatus 10 of the present invention includes a housing 16 that is mountable to a wall surface 18 adjacent the refrigeration unit 14 by any suitable means such as by brackets or hangers. Enclosed within the housing 16 is the electrical circuitry 20 for performing the various temperature-monitoring functions and for actuating the several alarm devices. It should be noted that many different electrical layouts and designs can be used, and the electrical circuitry shown in FIG. 5 is one representative design. The electrical circuitry 20 can be standard off the shelf items that may include transistors, resistors, diodes, and capacitors as needed for operating the alarm system and apparatus 10. Extending from the housing 16 is an electrical cord 22 having a plug 24 for providing power to the freezer alarm system and apparatus 10 from a standard electrical wall outlet or receptacle 26 such as an 110 v receptacle.

In order to communicate temperature variations or changes occurring within the freezer compartment 12 of the refrigeration unit 14 to the alarm and alert features, the present invention utilizes a temperature-sensing bulb 28 interconnected to the housing 16 by an elongated, flexible capillary tube 30. More specifically, the housing 16 includes a selectively adjustable thermostat 32 that can be manually preset to various temperature set points such as, for example, in one design the set points denoted by the numbers 20, 22, 24, 26, 28 30, 32, 34, and 36 degrees. The temperature-sensing bulb 28 senses temperature changes and variations within the freezer compartment 12 and conveys these changes and variations to the thermostat 32 so that the thermostat 32 can register when the temperature within the freezer unit 14 rises and exceeds the given temperature set point, value or temperature range. When the thermostat 32 registers the temperature rise, the normally open contacts or elements 34 of the thermostat 32- close thereby completing the circuit and initiating actions to be hereinafter described.

As shown in FIGS. 1–5, the freezer alarm system and apparatus 10 includes several signaling means that are actuated and powered for signaling the owner/user that the temperature set point has been exceeded and remedial or corrective action is required. Thus, mounted on the housing 16 is an audible buzzer alarm 36 for providing an audible alert to the owner/user that the refrigeration unit 14 needs checked because the temperature within the freezer compartment 12 has surpassed the preset value. The audible buzzer alarm 36 can include a volume control knob or dial that will be necessary if the freezer system and apparatus 10 includes remote alerts, i.e., signaling means that are positioned remote from the housing 16 and the refrigeration unit 14. In addition, the freezer system and apparatus 10 includes a visually discernible alarm and signaling means in the form of an alert light or light bulb 38 mounted to an alarm socket 40 that is mounted preferably on the top panel of the housing 16 for maximum visibility. The light bulb 38 may be, for example, a 40-watt long lasting bulb, and will be activated simultaneous with the activation of the audible buzzer alarm 36 when the temperature within the freezer compartment 12 has exceeded the preset value. It should be noted that it is possible to configure the light bulb 38 for remote placement and luminary signaling. Thus, the present invention includes two complementary signaling means: the audible buzzer alarm 36 and the visually discernible light bulb 38 so that if the owner/user if not positioned to observe the light bulb 38, he or she will be made aware of the potential refrigeration unit 14 problem by hearing the buzzer alarm 36. Contrawise, if the owner/user is not in position to hear the buzzer alarm 36, such as if he or she is mowing the lawn, then the light bulb 38 will be easily and readily visually discernible thereby alerting the owner/user that there is a potential problem with the refrigeration unit 14 that must be immediately attended to.

The freezer alarm system and apparatus 10 also includes several other features that enhance its usability. The alarm system and apparatus 10 includes a power on/off switch 42 mounted on the housing 16 for turning on the apparatus 10 and also for turning off the apparatus 10 during periods when the refrigeration unit 14 is being cleaned or serviced. In addition, the system and apparatus 10 includes at least one test switch or button 44 that can be actuated for testing the system and apparatus 10 to make sure the buzzer alarm 36 and the light bulb 38 will properly activate. Furthermore, the system and apparatus 10 can be configured so that the buzzer alarm 36 and the light bulb 38 stay on and active for a set amount of time to provide the owner/user with more time to react to the alarm conditions. While the thermostat 32 may normally be set at 32 degrees for activating the buzzer alarm 36 and the light bulb 38, some owners/users may set the thermostat 32 lower where it is imperative to maintain the freezer compartment 12 temperature below 32 degrees such as for hospital and laboratory refrigeration units. Setting the thermostat 32 at a lower temperature will also give the owner/user more time to respond to alarm conditions so that corrective actions can be expedited and produce and food item spoilage and loss can be minimized.

In mounting the system and apparatus 10 to the refrigeration unit 14, the general procedure would be to first locate and then mount the housing 16 adjacent the refrigeration unit 14 and the electrical receptacle 26. The lid 46 or door of the refrigeration unit 14 should be raised, and held in the raised position so that the temperature-sensing bulb 28 can be placed within the freezer cavity or compartment 12; and, more particularly, the temperature-sensing bulb 28 should be placed in the corner of the freezer compartment 12 approximately 12 to 16 inches under the top level of the produce and food items contained therein. The lid 46 can then be gently closed; for further protection the capillary tube 30 can be passed through and insulating and protective sleeve or gasket 48 that is interposed between the lid 46 and the sidewalls of the refrigeration unit 14. The temperature-sensing bulb 28 should be taped to the inside corner of the freezer compartment 12 to prevent it from freely dangling and being damaged during the placement and removal of produce and food items into and from the freezer compartment 12. The plug 24 of the electrical cord 22 of the housing 16 can then be plugged into the appropriately rated wall receptacle 26. The power on/off switch 42 can be turned on, and then the test switch 44 can be activated to ascertain that there is power to the apparatus 10, and that the audible buzzer alarm 36 and the light bulb 38 are in proper working order. The thermostat 32 can then be adjusted and set at the desired temperature set point. The refrigeration unit 14 will then run normally until conditions inside the freezer compartment 12 causes the temperature to exceed the set point of the thermostat 32 thereby activating the electrical circuitry 20 to energize and activate the audible buzzer alarm 36 and the light bulb 38 for providing the sound and visual alert signals to the owner/user. Owner/user intervention will then be necessary to rectify the situation, to prevent the spoilage or complete loss of the produce and food items stored within the freezer compartment 12, and to reset the thermostat 32 to the desired temperature set point after the corrective and remedial action has been completed.

A primary distinguishing feature of the freezer alarm system and apparatus 10 of the present invention is that it is not battery powered. The critical shortcoming of battery powered alarm systems is that if the user forgets to keep fresh batteries in the system, then when the system goes out the user may not be aware of this failure for days or even weeks. The present system and apparatus 10 alleviates this concern and worry. If the power to the system 10 should happen to go out, the user will immediately and automatically know that the temperature inside the freezer compartment 12 will start to rise. In order to confirm that power has been lost, the user should attempt to plug the system 10 into a separate circuit than the circuit user's pre-existing freezer is plugged into. This is to make certain that if the pre-existing freezer goes out and throws the circuit breaker in the process, the freezer alarm system 10 of the present invention will still be powered because it will be on a different circuit.

Although a preferred embodiment of the invention has been disclosed and described, it should be understood that numerous modifications, alterations, and variations may be made by one skilled in the art without departing from the scope of the invention as defined by the appended claims.

I claim:

1. A freezer alarm apparatus for monitoring the temperature conditions within a freezer compartment of a refrigeration unit that includes a lid and a plurality of adjoined sidewalls, comprising:
    a housing mountable adjacent to the refrigeration unit;
    a temperature-sensing bulb for placement within the freezer compartment of the refrigeration unit for monitoring and registering the temperature conditions occurring within the freezer compartment;
    a selectively adjustable thermostat mounted to the housing and capable of being manually present to one of a plurality of temperature set points;
    a protective sleeve interposed between the lid and one of the plurality of sidewalls of the refrigeration unit;
    an elongated, flexible capillary rube extending from the housing and through the protective sleeve to the temperature-sensing bulb for interconnecting the temperature-sensing bulb to the thermostat with the protective sleeve preventing the capillary tube from being damaged when the lid is closed;
    a buzzer alarm mounted to the housing and in electrical interconnection with the thermostat;
    an alert light mounted on the housing and in electrical interconnection with the thermostat; and
    electrical circuitry enclosed within the housing and electrically interconnecting the thermostat to the buzzer alarm and the alert light for allowing the simultaneous activation of the buzzer alarm and the alert light upon determination by the thermostat that the temperature conditions occurring within the freezer compartment have exceeded the temperature set point.

* * * * *